UNITED STATES PATENT OFFICE.

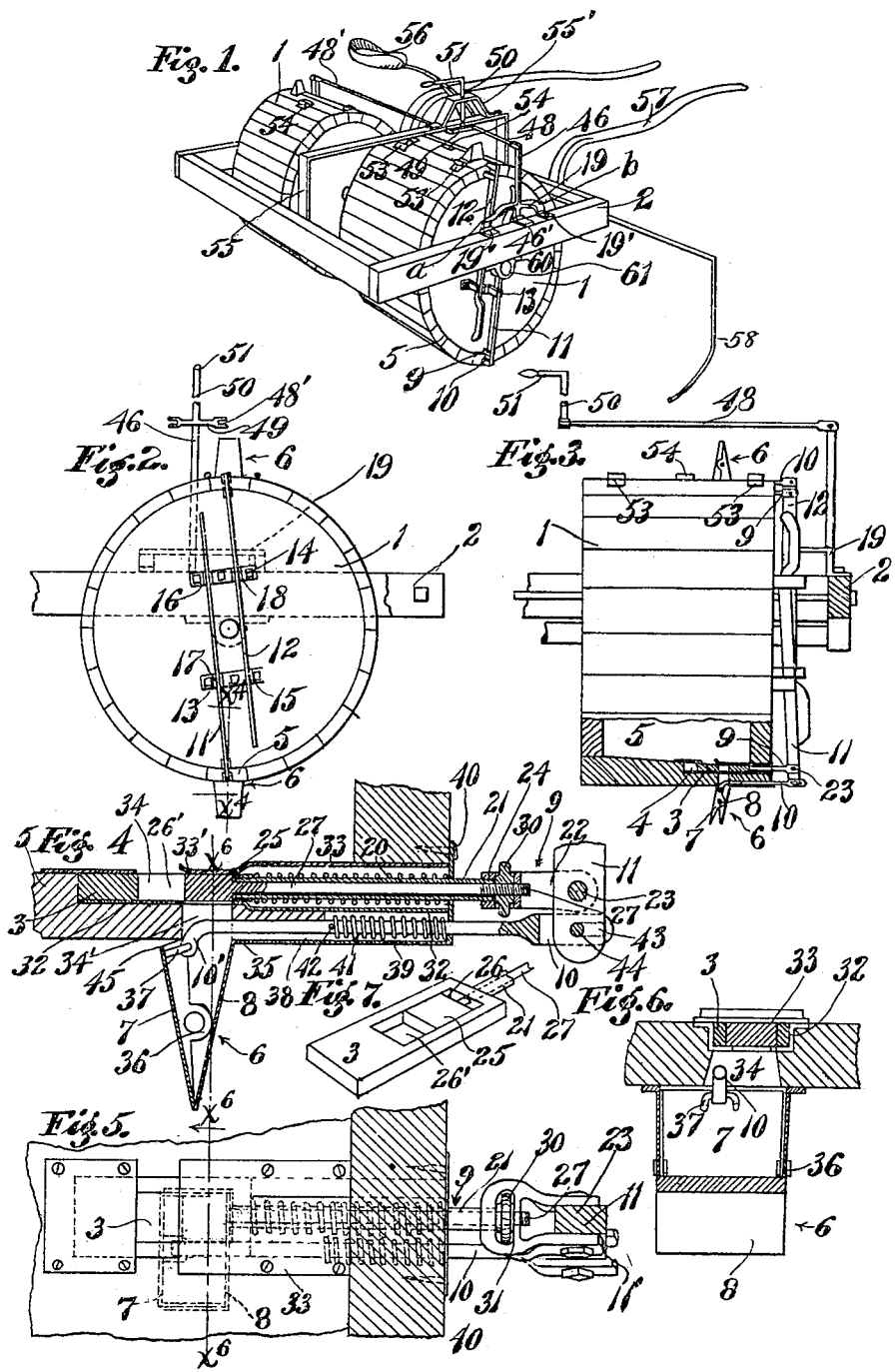

JUDAH N. TAYLOR, OF TOLUCA, CALIFORNIA.

PLANTER.

No. 818,799.  Specification of Letters Patent.  Patented April 24, 1906.

Application filed January 8, 1906. Serial No. 295,056.

*To all whom it may concern:*

Be it known that I, JUDAH N. TAYLOR, a citizen of the United States, residing at Toluca, in the county of Los Angeles and State of California, have invented a new and useful Planter, of which the following is a specification.

It is one of the objects of this invention to provide a planter simple in construction and having a wide and easily-varied range of adjustment, adapting the same to plant seeds of great difference in size.

Further objects are to provide a planter which will thoroughly cover the seed and which is adapted to plant corn or other grain in rows extending across the field in both directions, so that the growing grain may be more thoroughly cultivated; also, to provide the planter with a large hopper which will only require filling after long intervals of use and to afford means of agitating the grain within the hopper to prevent clogging.

Another object is to provide a light-draft planter which can be readily drawn by one horse when designed to plant two rows and which may be drawn by hand when designed to plant one row only.

Referring to the acompanying drawings, illustrative of the invention, Figure 1 is a perspective view of the complete planter. Fig. 2 is an end elevation of the planter, omitting the seat, shafts, and portions of the frame. Fig. 3 is a rear elevation, partly in section, of one of the drums and its seed-dropping attachments. Fig. 4 is an enlarged fragmental section of the seed-dropping device on line $X^4 X^4$ of Fig. 2. Fig. 5 is a plan of a portion of the seed-dropping attachments of one of the drums, a fragment of the drum being shown and the end of the drum being sectioned. Fig. 6 is a fragmental section on line $X^6 X^6$ of Figs. 4 and 5, and Fig. 7 is a perspective view of the adjustable dropping-slide.

Briefly considered, this improved planter comprises one or more rollers 1, each having a seed-chamber therein, said rollers being mounted in a suitable frame 2 and being each provided with a seed-dropping device adapted to be operated by means mounted on said frame 2. Each seed-dropping device comprises a seed-valve or dropping-slide 3, reciprocating in a suitable slideway 4, channeled out of the inner side of one of the staves 5, of which the peripheral portion of rollers 1 is preferably formed, and a plunger 6, forming a pocket adapted to receive seed from slide 3, said plunger being provided with a movable jaw 7 and a stationary jaw 8.

9 designates a rod for operating the seed-valve 3, and 10 designates a rod for opening and closing the jaw 7. Said rods 9 and 10 are operated simultaneously by arms 11 12 in a manner hereinafter more fully described. Arm 11 is pivoted to a bracket 13, secured to the end of roller 1 by any suitable means. Arm 12 is pivoted to bracket 14, secured to the same end of roller 1, as will be seen by reference to Figs. 1 and 2. Arms 11 and 12 are placed adjacent to and parallel with each other, so that brackets 13 14 may be provided with guides 15 16, each bracket thereby forming a pivotal support for one arm and a guide for the other arm, said guides 15 16 being adapted to direct the swinging movement of arms 11 12 on pivots 17 and 18.

19 designates a beveled lug or bracket secured to one end of frame 2 in the path of arms 12 13 to swing the lower end of each of said arms outwardly upon each revolution of roller 1, thereby moving the rods 9 and 10 outwardly to operate the dropping device. Bracket 19 is beveled near each end at $a$ and $b$.

The dropping-slide 3 is reciprocated by arm 9 and works on the same general principle as other seed-dropping devices of its class, but is provided with means for regulating the amount of grain discharged at each operation thereof. For this purpose said slide 3 has a hollow stem or pipe 21, which is furnished at its outer end with a head 22, said head 22 being pivoted to arm 11 at 23. Head 22 may be attached to stem 21 by means of an internally-threaded socket 24, the stem 21 being externally threaded at its outer end for this purpose.

25 designates a block slidable in a slot or elongated opening 26, with which slide 3 is provided.

27 designates an adjusting-rod extending longitudinally within stem 21 and projecting from the outer end thereof.

30 designates a thumb-nut secured to the outer end of operating-rod 27, and 31 designates oppositely-disposed apertures or cutaway portions of head 22, through which thumb-nut 30 is accessible. Said thumb-nut 30 is internally threaded, and adjusting-rod 27 has an externally-threaded portion engaging the threaded portion of the nut, so that when nut 30 is rotated within the walls of aperture 31 adjusting-stem 27 and slidable block 25, carried thereby, are moved to and fro, thereby increasing or diminishing the size of the seed-retaining opening 26'.

32 designates a plate like a rectangular trough, the top of said plate being furnished with a cover 33 to form a suitable casing for the stem 21 and spring 20. Said cover 33 is composed of a resilient portion one end of which is upturned at 33' and yieldingly bears against the bottom of the hopper at said end to act as a combined brush and cut-off to cut the seed off from opening or pocket 26' between block 25 and the inner end of slot 26.

34 designates the feed-opening leading from the seed-chamber into the inner end of the slideway 4, and 34' designates the discharge-opening leading from the outer end of slideway 4 into plunger 6, said opening extending across the upper end of stationary jaw 8 only of the plunger. The stationary jaw 8 of the plunger 6 is provided at its upper end with a flange 35 or other suitable means for securing said jaw 8 to the roller.

36 designates perforated ears with which jaw 7 is provided, said ears extending inside jaw 8 and pivoting jaw 7 thereto, jaw 7 being adapted to telescope into jaw 8 to some extent above ears 36 when swung, as shown in Fig. 3, to drop the seed. A loop 37 extends from the upper end of jaw 7, rod 10 having a down-bent portion 10', provided with an eye through which said loop extends. The outer end of arm 11 may be slightly offset at 11' in order to throw rod 10 a little to one side of seed-opening 4, so that there will be no danger of obstructing said opening. A suitable groove 38 is provided in the side of the roller for the reception of rod 10, said groove 38 being covered by a plate 39, having an upturned portion 40, forming an end closure for groove 38. Said upturned portion 40 of the plate has suitable openings fitting around pipe 24 and rod 10.

41 designates a spiral spring surrounding rod 10. Said rod 10 is provided with a pin 42, against which the inner portion of spring 41 bears to return rod 10 to normal position after it has been pulled outwardly by arm 11. The connection between rod 10 and arm 11 is made by means of a slot 43 and pin 44 in order to lessen the distance which arm 10 moves with relation to seed-valve 3 and also to make the jaw 7 open a little later than the dropping of the seed thereinto by valve 3. The upper portion of jaw 7 is cut away at 45 in order to provide room for movement thereof with relation to the side of roller 1.

Plunger 6 when the jaw 7 thereof is closed forms a hollow trowel, which is flattened circumferentially of the roller. This form of plunger readily enters the earth as the roller 1 rotates. Arms 12 and 13 of beveled bracket 19 are so disposed with relation to each other that the jaw 7 does not begin to open until after the points of plunger 6 have begun to enter the earth. In the drawings I have shown two plungers 6 placed opposite each other; but it is to be understood that one only may be used, if desired. One may be often used to a better advantage on a smaller roller when the planter is to be operated by hand. Each of the plungers shown is provided wth the same dropping device for discharging seed thereinto. Bracket 19 is hinged at each end to frame 2 at 19'. An upright link 46 is also hinged to the frame at 46' between the hinges 19', said link 46 being welded or otherwise secured to the outer side of bracket 19 to swing as one piece therewith.

48 48' designate cross-bars connected with link 46, at the upper end thereof. Cross-bars 48 48' are pivoted at their inner ends to one end of link 49, an upright shaft 50 being secured to the center of said link 49. Said shaft 50 is rotated by handle 51 to pull cross-bars 48 48' and links 46 inwardly, thereby throwing the dropping devices of each roller into gear by bringing beveled brackets 19 into the path of arms 11 and 12 to operate the dropping mechanism of each roller, it being understood that each roller is provided with parts corresponding to those of the other.

By providing the planter with a frame which incloses the rollers and by mounting beveled brackets 19 on each end of the frame above supporting-shaft 61 convenient means extending across the top of the roller inwardly toward and accessible from the seat may be furnished for throwing the brackets into and out of the operative position.

In the present embodiment of the invention the staves 5 are about two inches thick at the inner end, decreasing to about one and one-half inches in thickness at the outer end. The bevel of the staves tends to keep the grain over the feed by making the internal diameter of the hopper increase toward the feed. The thick staves afford room for countersinking grooves into opposite sides of a stave, as has been already indicated in describing the arrangement of the dropping mechanism. The staves are made broad enough so that they can be used to attach the plunger 6 thereto. As shown in the drawings, the stave to which the plunger is attached is furnished on one side with hinges at 53 and on the opposite side with a lock 54, thereby forming a door through which the hopper may be filled. With this construction it is necessary to detach rod 10 and head 22 from the arm 11 or 12 to fill the hopper; but since the hopper only needs an occasional filling such a construction is not inconvenient and renders the feed-slide accessible.

55 designates a standard supported by the frame 2 and having an upright bracket 55' fastened thereto to form therewith a suitable support for shaft 50. Handle 51 is placed within convenient reach from seat 56, said seat being desirably secured to the front part of the frame. The planter shown in the drawings has thills 57 and is adapted to be drawn by a single horse.

58 designates a marking device.

60 designates a bearing for supporting the frame 2 above rollers 1, and 61 a shaft extending through both rollers and engaging said bearing 60 at each end.

The planter shown in the drawings is designed to plant corn in hills three and one-half feet apart in the row, the rows also being spaced three and one-half feet apart.

The rollers 1 are both secured to the shaft 61 by squaring the shaft or otherwise, so that the dropping devices all maintain the same circumferential position with relation to each other. By varying the arc in which the rollers move in making turns at the ends of rows a skilful driver can cause the hills of each new row to come opposite the hills of the preceding row.

I claim as my invention—

1. A roller having a seed-chamber therein, a dropping-slide adapted to deliver seed through the periphery of said roller, an arm operatively connected with said slide, said arm extending across an end of said roller and moving therewith, and stationary operating means for said arm carried by said frame.

2. A roller having a seed-chamber therein, a dropping-slide adapted to deliver seed through the periphery of said roller and an arm operatively connected with said slide, said arm extending across an end of said roller and moving therewith, and automatic operating means for said arm.

3. In combination, a frame, a roller having a seed-chamber therein, and a dropping device adapted to deliver seed through the periphery of said roller, said dropping device including an operating-arm extending across the end of said roller and pivoted thereto, and a beveled lug mounted on the frame in the path of said arm to operate the same.

4. A roller having a seed-chamber therein, a seed-valve in the periphery of said roller, a plunger having a pocket adapted to receive seed from said valve, said plunger being provided with a movable jaw to discharge seed therefrom, a pivoted arm extending across the end of said roller and moving therewith, a frame, and a beveled lug mounted on said frame in the path of said lever to swing the same.

5. In a planter, a roller having a seed-chamber therein and a dropping device at one end, said roller having peripheral walls increasing in thickness from the end at which the dropping device is located toward the other end.

6. A planter provided with a roller having a seed-chamber therein, and a seed-dropping device for discharging seed from one end of said chamber, said chamber being of greater interior diameter at the end where the seed-dropping device is located than at the other end.

7. In a planter, a roller having a seed-chamber therein, a seed-valve in the periphery of said roller, a plunger having a pocket therein adapted to receive seed from said valve, an arm carried by said roller and pivoted thereto, said arm being adapted to move said valve and open said plunger, a frame, and means carried by said frame for actuating said arm.

8. In a planter, a roller having a seed-chamber therein, a seed-valve in the periphery of said roller, a plunger having a pocket therein adapted to receive seed from said valve, an arm carried by said roller and pivoted thereto, said arm being adapted to move said valve and open said plunger, a frame, and a beveled lug carried by said frame for actuating said arm.

9. In a planter, a roller having a seed-chamber therein, a seed-valve in the periphery of said roller, a plunger having a pocket therein adapted to receive seed from said valve, an arm carried by said roller and pivoted thereto, said arm being adapted to move said valve and open said plunger, a beveled bracket hinged to said frame, and means for swinging said bracket into and out of the path of said arm.

10. In a planter, a roller having a seed-chamber therein, a seed-valve in the periphery of said roller, a plunger having a pocket therein adapted to receive seed from said valve, an arm carried by said roller and pivoted thereto, said arm being adapted to move said valve and open said plunger, a frame, means carried by said frame for actuating said arm in one direction, and resilient means for restoring said valve and plunger to the normal position.

11. In a planter, a frame, a supporting-shaft therefor and a roller mounted on said shaft provided with a seed-chamber therein and inclosed by said frame, a dropping device adapted to deliver seed from said roller, an arm extending across, moving with and pivoted to said roller to operate said device, a beveled bracket mounted on the end of said frame above the shaft and means extending inwardly from the top of the roller for moving said brackets into and out of the path of said arm.

12. In a planter, a frame, a supporting-shaft therefor, a pair of rollers on said shaft provided with seed-chambers therein and inclosed by said frame, a dropping device adapted to deliver seed from each roller, an arm extending across and moving with and pivoted to each roller to operate said device, beveled brackets mounted on each end of said frame above the shaft, and means extending inwardly over the top of each roller for moving said brackets into and out of the paths of said arms.

13. In a planter; a frame; a supporting-shaft therefor; a roller mounted on said shaft having a seed-chamber therein; a seed-dropping device adapted to deliver seed through the periphery of said roller, said device comprising a dropping-slide and arm for operating the same, and a plunger adapted to receive seed from said slide and provided with a movable jaw and arm for operating the same; an arm extending across the end of the roller pivoted thereto and moving therewith, said last-named arm being connected with said first-named arms to simultaneously operate the same; and a lug mounted on the frame in the path of the arm which extends across the end of the roller to operate the same.

14. In a planter, a frame, a supporting-shaft therefor, a roller mounted on said shaft having a seed-chamber therein, a seed-dropping slide in the periphery of said roller, said slide having a slot therethrough, a portion of which is adapted to form a seed-pocket, a block adjustable along said slot to increase and diminish the size of said pocket, a hollow rod extending to the end of the roller for operating the slide, an adjusting-rod extending from the block through said hollow rod to the end of the roller for adjusting said block, an adjusting-nut inside said hollow rod and having a screw-threaded engagement with said adjusting-rod and accessible at the end of the roller, and means for automatically reciprocating said hollow rod.

In testimony whereof I have hereunto set my hand at Los Angeles, California, this 23d day of December, 1905.

JUDAH N. TAYLOR.

In presence of—
ALBERT H. MERRILL,
JAMES R. TOWNSEND.